Dec. 19, 1961 R. L. TEWKSBURY 3,014,200
VEHICLE STOP INDICATING APPARATUS
Filed Jan. 12, 1960 2 Sheets-Sheet 1
FIG. 1
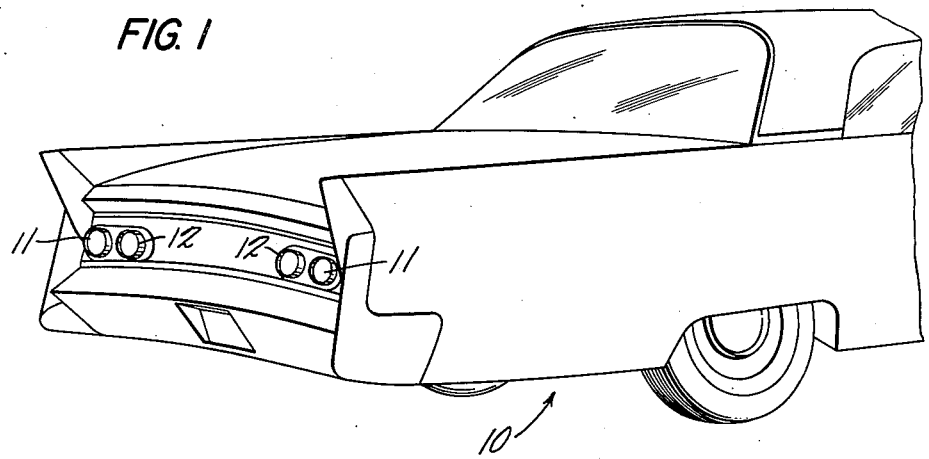
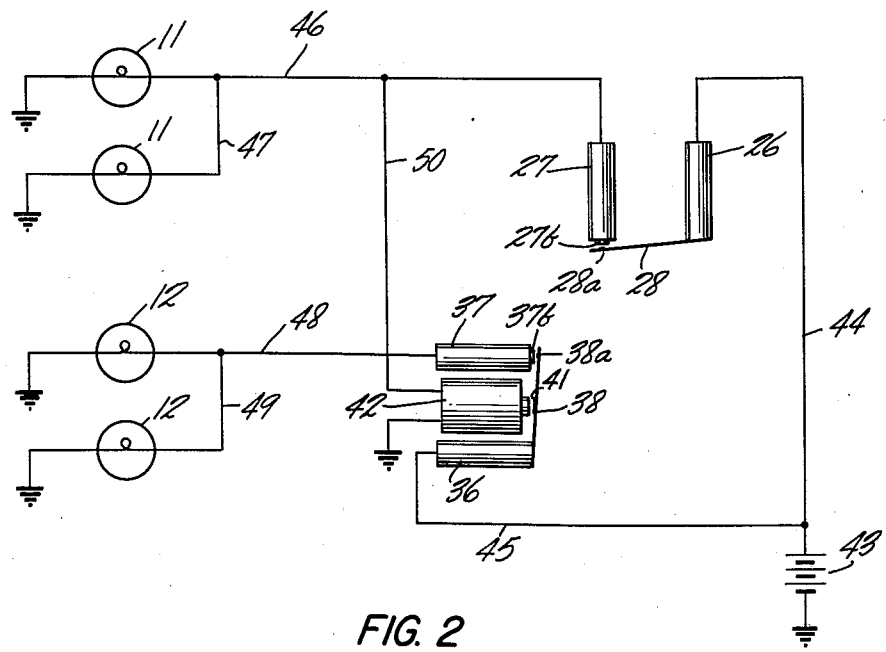
FIG. 2
INVENTOR.
ROBERT L. TEWKSBURY
BY
Brumbaugh, Free, Graves + Donohue
his ATTORNEYS

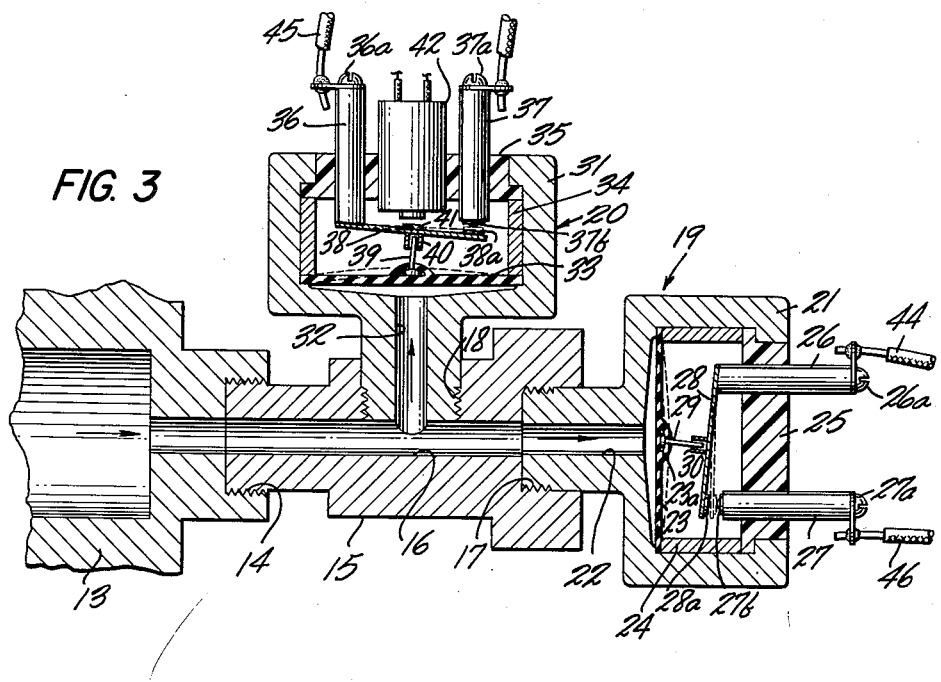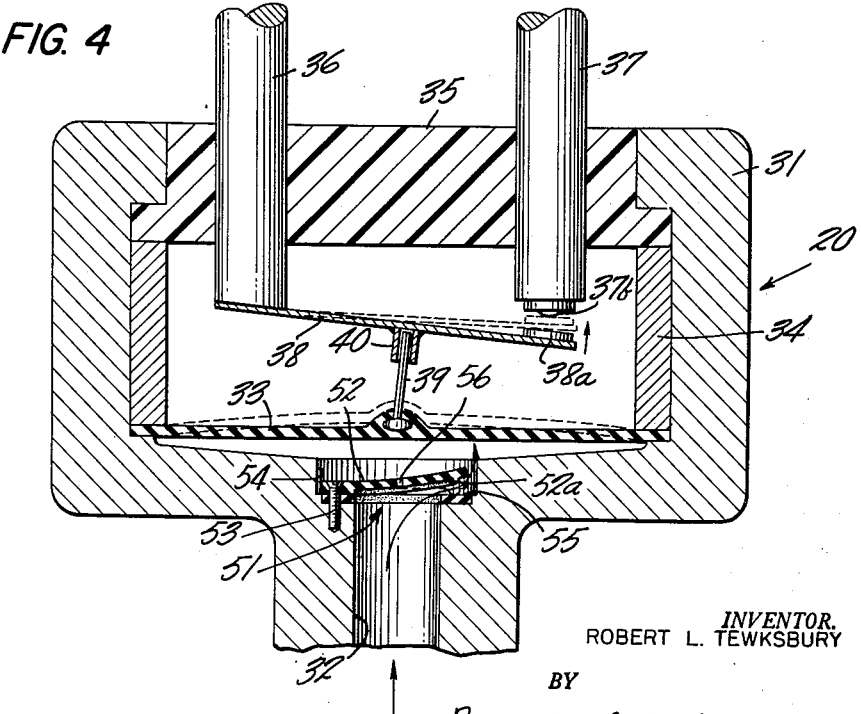

United States Patent Office 3,014,200
Patented Dec. 19, 1961

3,014,200
VEHICLE STOP INDICATING APPARATUS
Robert L. Tewksbury, Astoria, N.Y.
(21—03 73rd St., Jackson Heights, N.Y.)
Filed Jan. 12, 1960, Ser. No. 1,888
1 Claim. (Cl. 340—71)

This invention relates to light apparatus for vehicles and, in particular, to a stop light system providing distinct indications of normal and panic stops.

Stop lights ordinarily found on automobiles and trucks include one or more lights, visible from a trailing vehicle, energized in response to vehicle braking. An occupant of a following vehicle is unable to determine from the flash of brake lights if the forward vehicle has been braked lightly or whether extraordinary force has been applied to the brake to stop the lead vehicle in the shortest possible distance. These circumstances often lead to rear end collisions, particularly on high speed superhighways.

A number of proposals to signal more information to the operator of a following vehicle have never been widely used. For example, one light system closed a circuit to a yellow caution light upon release of the accelerator; subsequent actuation of the brake extinguished the yellow light and illuminated a red light. No indication was given to a following vehicle of the nature of the braking effort applied to the leading braked vehicle.

Another proposed brake light arrangement provided lights flashed at a rate proportional to braking of a vehicle. It is apparent that the lack of any standard by which the flashing rate could be gauged rendered such apparatus ineffective.

The present invention overcomes the above difficulties and provides brake light apparatus signalling to trailing vehicles normal braking and extraordinary or panic stop braking. To this end, switch means controlling two circuits are operatively coupled to the vehicle braking mechanism. Normal braking results in energization of one circuit to illuminate the normal stop light, and extraordinarily high effort braking energizes both circuits to illuminate both the stop light and a distinctive panic light located at the rear of the vehicle.

In one embodiment of the invention the switch means are actuated in response to fluid pressure in a hydraulic braking mechanism.

Another feature of the invention comprises an electrical hold circuit associated with the normal brake light circuit to maintain the panic light circuit closed until the normal brake lights are extinguished. In another embodiment of the invention, a check valve arrangement maintains the panic brake light circuit closed for the predetermined interval.

These and further advantages of the invention will be more readily understood when the following description is read in connection with the accompanying drawings, in which:

FIGURE 1 is a perspective of the rear section of an automobile illustrating a typical arrangement of brake lights included in apparatus in accordance with the present invention;

FIGURE 2 is a schematic circuit diagram of illustrative electrical circuits in brake light apparatus in accordance with the invention;

FIGURE 3 is a sectional view showing typical switch means used to close the electrical circuits of FIGURE 2 to the indicating lights in the inventive brake light apparatus; and FIGURE 4 is a modified form of one portion of the switch means shown in FIGURE 3.

Referring to an illustrative embodiment of the present invention in greater detail with particular reference to the drawings, an automobile 10 has mounted on its rear deck in a suitable manner conventional red stop lights 11 and panic stop lights 12 of a distinctive color such as brilliant orange. The lights 11 and 12 are shown mounted adjacent to each other on the rear of the automobile 10. However, any desired disposition of lights may be used such, for example, as a coaxial arrangement wherein a larger stop light 11 has mounted in its center a smaller extremely bright panic light 12. Further, the stop lights 11 may be mounted on both sides of the vehicle and the panic light 12 centered between the stop lights.

Examining typical switch means for use in the invention with reference to FIGURE 3, a hydraulic brake fluid reservoir housing 13 is formed with a threaded opening 14 to receive a threaded housing 15 provided with a through fluid passage 16. Threaded openings 17 and 18 in the housing 15 respectively receive pressure actuated switches 19 and 20. The threaded opening 14 may comprise the socket normally receiving a single pressure responsive brake switch.

The switch 19 is shown as a conventional pressure responsive unit formed by a housing 21 adapted to be threaded into the opening 17. A fluid passage 22 in the housing 21 communicates with the passage 16 in the housing 15 to subject a resilient diaphragm 23, held in position by a ring 24, to hydraulic fluid pressure. An insulating disc 25 closes the housing 21.

A pair of conducting rods 26 and 27, formed to receive terminal lug securing screws 26a and 27a at their ends, extend through the disc 25 into the housing 21. A spring arm 28, fastened by one end to the other end of the rod 26, normally extends to a position adjacent to but out of contact with the other end of the rod 27. Actuation of the arm 28 results in engagement of a contact 28a on its other end with a contact 27b on the end of the rod 27. An arm actuating finger 29, secured in an enlarged supporting portion 23a of the diaphragm 23, is retained in position by a cylinder 30 attached to the resilient arm 28.

The switch 20 is formed of a housing 31 provided with a threaded extension fitting the opening 18 in the housing 15, such extension including a fluid passage 32 transmitting hydraulic fluid pressure to a resilient diaphragm 33 of somewhat heavier construction than the diaphragm 23 of the switch 19. A ring 34 holds the diaphragm 33 in position, and an insulating disc 35 closes the housing 31.

A pair of conducting rods 36 and 37, carrying lug securing screws 36a and 37a at their upper ends, extend through the disc 35 into the housing 31. A spring arm 38 secured at one end to the rod 36 normally maintains a contact 38a on its other end out of engagement with a contact 37b on the lower end of the rod 37. The resilient arm 38 is actuated by a finger 39 fastened in the diaphragm 33 and held in position by a cylinder 40 on the underside of the arm 38. A disc 41 of magnetic material on the upper side of the resilient arm 38 cooperates with a solenoid 42, subsequent to actuation of the arm 38, to hold the arm in its engaged position so long as the solenoid 42 remains energized. However, energization of the solenoid 42 will not displace the arm 38 from its normal position to close the contacts 37b and 38a.

Referring to FIGURE 2 for an explanation of typical electric circuits in accordance with the invention, a grounded electrical source 43 is coupled through conductors 44 and 45 to rods 26 and 36, respectively. Conductors 46 and 47 connect the rod 27 to grounded normal stop lamps 11; in the same manner conductors 48 and 49 couple the rod 37 to grounded panic lamps 12. A further conductor 50 leads from the conductor 46 to the grounded solenoid 42.

In a typical operation of the inventive system, assuming the operator of the vehicle 10 exerts any normal pressure on the brake pedal, which is any pressure up to a predetermined high braking effort, hydraulic fluid pressure in the passages 16 and 22 distorts the diaphragm 23 sufficiently to cause the finger 29 to actuate the arm 28 and displace the contact 28a into engagement with the contact 27b, thereby closing a circuit from the source 43 to the stop lights 11 through the conductor 44, the rod 26, the arm 28, the rod 27, and the conductors 46 and 47. However, the fluid pressure transmitted through the passage 32 to the heavier and more pressure resistant diaphragm 33 of the switch 20 will be insufficient to cause actuation of the arm 38 and closure of the contacts 37b and 38a. Therefore, the operator of a following vehicle will be signalled that the leading vehicle is being slowed or normally stopped.

Assuming next that the operator of the vehicle 10 applies extraordinary effort to the brake pedal for the purpose of a panic stop, the extraordinary brake fluid pressure applied through the passage 22 to the diaphragm 23 will again result in closure of the contacts 28a and 27b to energize the stop lamps 11. Moreover, the fluid pressure in the passage 32 will now be sufficient to distort the heavier diaphragm 33 resulting in actuation of the arm 38 and closure of the contacts 37b and 38a to energize the panic lamps 12 through the conductor 45, the rod 36, the arm 38, the rod 37, and the conductors 48 and 49.

The potential on the line 46 when the lamps 11 are illuminated energizes the solenoid 42 through the conductor 50. Since the arm 38 is now in its actuated position, the solenoid 42 is effective to hold the contacts 37b and 38a engaged. Therefore, even after the brake fluid pressure is reduced, the panic lights 12 remain energized until the brake is released and the brake lights 11 are extinguished.

In FIGURE 4 a modified panic light switch has been shown. The component parts are similar to those of the switch 20 of FIGURE 3 except that the solenoid 42 has been omitted and a check valve 51 has been positioned in the passage 32. The valve 51 includes a resilient flap 52 fastened in position by screws 53 in an enlarged section 54 of the passage 32. A circular rib 52a on the underside of the flap 52 sealably engages a resilient ring 55 mounted on the lower edge of the section 54. A bleed hole 56 extends through the flap 52.

In operation, hydraulic pressure in the passage 32 opens the valve 51 and distorts the diaphragm 33. When the fluid pressure drops, the valve 51 closes and the diaphragm 33 remains distorted to maintain the contacts 38a and 37b in engagement until the diaphragm 33 releases the arm 38 after sufficient fluid has escaped through the opening 56 in the flap 52. The size of the hole 56 determines the time the contacts 37b and 38a remain closed, and it may be adjusted for any suitable interval. Accordingly, the panic stop lamps 12, when using the switch shown in FIGURE 4, will remain illuminated for a period of thirty seconds, for example, subsequent to extraordinary braking of the vehicle 10.

The above described vehicle light apparatus indicates clearly to trailing vehicles if the operator of a leading vehicle contemplates a normal or panic stop. It will be understood that the above-described embodiments of the invention are illustrative only and modifications thereof will occur to those skilled in the art. Therefore, the invention is not to be limited to the specific apparatus disclosed herein, but is to be defined by the appended claims.

I claim:

In a hydraulic braking mechanism equipped vehicle, stop light apparatus comprising a stop light and a distinctive panic light both visible from a trailing vehicle, normally open energizing circuits for the stop light and the panic light, a pressure responsive stop light switch having one set of normally open contacts which when closed complete the energizing circuit to the stop light, a pressure responsive panic light switch having one set of contacts and including a pressure responsive diaphragm that actuates an armature in the panic switch, one of the panic switch contacts being carried by the armature and normally not engaging the other panic switch contact, the panic switch contacts when closed completing the energizing circuit to the panic light, a solenoid in the panic light switch that is energized when the stop light switch is closed and the stop light circuit energized, the solenoid when energized retaining the armature in its actuated position with the panic light switch contacts closed, means directing hydraulic brake fluid pressure to the stop and panic pressure responsive switches, the stop light switch responding to any normal hydraulic pressure in the braking mechanism to close the stop light contacts thereby illuminating the stop light and energizing the panic switch solenoid, the stop light switch and the panic light switch responding to extraordinary hydraulic pressure in the braking mechanism to close the stop light contacts and to distort the diaphragm to actuate the panic switch armature and urge its contact into engagement with the other panic switch contact, the armature being held in position by the energized solenoid, thereby illuminating both the stop light and the panic light as long as there is normal hydraulic pressure in the brake mechanism.

References Cited in the file of this patent

UNITED STATES PATENTS

| | | |
|---|---|---|
| 1,200,460 | Booraem | Oct. 10, 1916 |
| 2,069,382 | Monton et al. | Feb. 2, 1937 |
| 2,751,575 | Jacobs et al. | June 19, 1956 |
| 2,891,234 | Hague | June 16, 1959 |
| 2,946,042 | Beasley | June 19, 1960 |